UNITED STATES PATENT OFFICE.

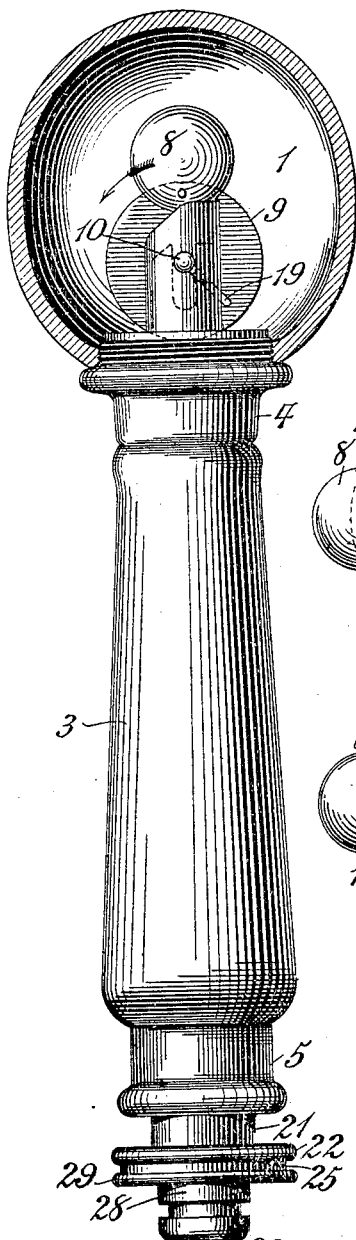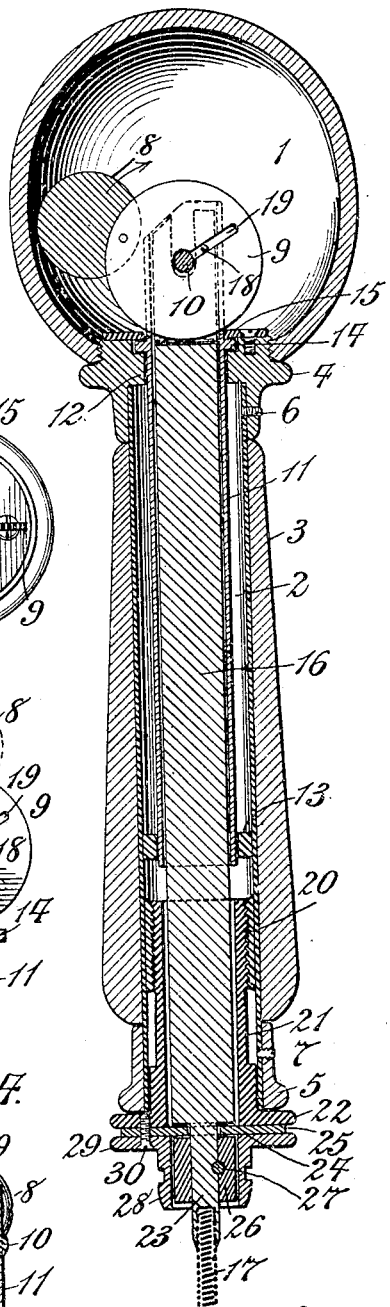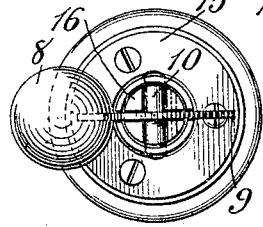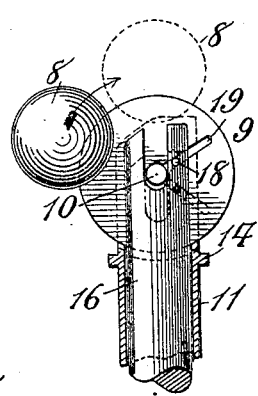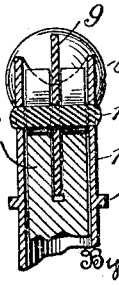

HAROLD W. SHONNARD, OF EAST ORANGE, NEW JERSEY.

MEDICAL AND SURGICAL VIBRATOR.

No. 799,272.            Specification of Letters Patent.            Patented Sept. 12, 1905.

Application filed March 27, 1905. Serial No. 252,151.

*To all whom it may concern:*

Be it known that I, HAROLD W. SHONNARD, a citizen of the United States, residing in the city of East Orange, county of Essex, and State of New Jersey, have invented a certain new and useful Improvement in Medical and Surgical Vibrators, of which the following is a specification.

The present invention has relation to an improved device for producing rapid vibrations for purposes of local treatment in medicine and surgery.

The principal object of the invention is the provision of means which can be constructed in convenient and easily-portable form at a reasonable cost to carry out the purposes above named, which is capable of practically universal application, which can be quickly and easily regulated by the unskilled for all desired degrees of action, and which will not readily get out of order.

Reduced to its simplest form this invention comprises a rotary spindle, a weight attached thereto and capable of adjustment toward and away from the axis of said spindle, and a body connected to the spindle and adapted to be brought into contact with the patient's body.

A preferred form of this device is shown in the accompanying drawings, wherein—

Figure 1 is a view, partly in section, of the invention in its inactive position. Fig. 2 is a median longitudinal section of the same in its most active position. Fig. 3 is a top plan view of the same with the hollow tactor removed. Fig. 4 is a detail, partly in side view and partly in section, showing the weight and associated parts; and Fig. 5 is a vertical sectional detail of the same portion of the device.

In the preferred embodiment of this invention, which is herein shown and described, the vibratory weight is so supported as to be adjustable in a circle whose plane is at an angle to the plane of operative revolution of the weight. As before stated, any means whereby the position of the weight with relation to the axis of revolution may be altered is within the scope of this invention, and therefore the plane of the circle wherein the weight moves for adjustment in the preferred device may have any desired position outside of the plane of operative revolution of the weight itself. Obviously, however, the best results follow from so placing the circle of adjustment that the axis of operative revolution of the weight lies in the plane of said circle and passes through its center, and this is the specific arrangement shown in the drawings.

In the preferred form shown the body intended for contact with the patient, which is herein termed the "tactor," is a hollow body 1 substantially globular in form; but it should be understood that any other form of tactor may be employed and also that it is not essential to this invention that the vibrating body be contained within a hollow tactor.

The handle of the device, onto which the tactor is screwed, is supported by an interior fixed tube 2, carrying an outer handle composed of a middle wooden portion 3 and two end metal pieces 4 and 5. The last-named pieces are secured in place by small screws 6 and 7 or by other appropriate means.

The vibratory weight (shown at 8 in the form of a small metal sphere) is carried by a compound rotary spindle, whereby both operative rotation of the weight and adjustment thereof toward and from the axis of revolution may be effected through the handle. This may be constructed in a variety of ways without departing from this invention; but the preferred construction is as follows: The weight 8 is carried near the circumference of a disk 9, capable of turning on a pivot 10, supported in proper bearings by a rotary tube 11, which constitutes the outer member of the compound spindle above mentioned. This outer tubular spindle is free to turn in bearings 12 and 13 in the metal piece 4 and within the tube 2, respectively; but it is prevented from longitudinal movement relative to the handle. This is preferably accomplished by providing a flange or collar 14 around the tube 11 and near its top, which collar fits within an appropriate circular recess in the upper face of the metal piece 4, being secured in said recess by a cover-plate 15, screwed or otherwise fastened in place, as shown in Figs. 2 and 3. The inner member of the compound spindle is preferably a solid metal bar or rod extending down through the length of the tube 11, as shown at 16, and connected with any appropriate means for applying power thereto—as, for instance, the flexible shafting 17. The top of the rod 16 is forked in two directions (as plainly shown in Figs. 2, 3, 4, and 5) to admit the disk 9 in one direction and its pivot 10 at right angles thereto. These forks are made deep enough to permit all the relative longitudinal movement necessary for operation of the adjustment hereinafter described. Near the upper end of the rod 16 and traversing the fork which admits the disk 9 a small pin 18 is fixed in the rod. This pin passes loosely through an appropriate slot 19 in the disk 9, but does not extend beyond the outer surfaces of the rod 16.

From the description thus far given it will be seen that any relative longitudinal movement between the two members of the compound spindle 11 and 16 will produce rotation of the disk 9 and consequent movement of the weight 8 for adjustment. This invention covers means for producing such relative movement whichever member of the compound spindle is moved.

When the rod 16 is pushed inward to its limit, the pin 18 within the slot 19 acts to rotate the disk 9 in its own plane around the pivot 10 with the arrow in Fig. 1, so as to bring the weight 8 into the position shown in Fig. 2. Here the ball 8 is at its maximum distance from the axis of operative revolution, and when rotation of the compound spindle is set up, through the shafting 17 or otherwise, the weight 8 is made to rotate through its maximum orbit, and thus to produce a maximum vibration at the upper end of the handle which carries the tactor.

When the rod 16 is drawn downward or outward to its limit, the pin 18 causes the disk to turn with the arrows in Figs. 2 and 4, so as to bring the weight into the position shown in Fig. 1, where, being located in the extension of the axis of revolution, the center of gravity of the weight stands still and all vibratory effect is avoided. All positions between these extremes can of course be produced by appropriate longitudinal adjustment of the rod 16, and thus delicate variations in the force and amplitude of the desired vibration may be effected without changing its frequency.

A great variety of means may be employed for effecting the necessary relative longitudinal adjustment of the rod 16 and tube 11, all of which would be within the general scope of this invention. In the preferred device shown this adjustment is accomplished as follows: A female screw-thread 20 is provided within the core-tube 2, near the lower end of the same, and an adjusting-tube 21 is provided with a male thread fitting the thread 20. The tube 21 loosely surrounds the rod 16 and has an external flange 22, adapted to be easily grasped by the fingers in accomplishing adjustment of the weight 8. At the outer or lower end of the rod 16 there is an extension of smaller diameter, (shown at 23,) whereby a shoulder is formed at 24 on the end of said rod. A thrust-plate 25 has a central aperture fitting over said extension 23, so that the plate may bear directly upon the shoulder 24, as shown in Fig. 2. In order to provide a bearing whereby the thrust-plate 25 may act to draw the rod 16 outward, a sleeve 26 fits over the extension 23 outside of said thrust-plate and is held in place by a pin 27, which prevents both rotation and longitudinal movement of said sleeve on the extension. An outer thimble 28 loosely surrounds the sleeve 26 and is provided with a flange 29, whereby it is secured to the flange 22 by screws 30, traversing the thrust-plate 25. On turning the two flanges 22 and 29 together clockwise the adjustment-tube 21 will move inward and carry with it the thrust-plate 25, which bearing upon the shoulder 24 will force the rod 16 inward and move the weight 8 away from the axis of operative rotation, which conforms to the geometrical axis of the rod 16. On turning the flanges 22 and 29 in the opposite direction the thrust-plate 25 will bear on the sleeve 26 and draw the rod 16 outward, thus diminishing the violence of the vibration. Either of these movements may be made without discontinuing the operative rotation, and thus a treatment may be begun as lightly as desired, being increased in force without interruption and by imperceptible gradations.

Many changes may be made in the construction of this device without departing from the spirit of this invention, and I am not to be understood as limiting myself to the details herein shown and described.

What I claim is—

1. In a device of the class described, a tactor, a handle therefor, a rotary spindle carried by said handle, a vibratory weight connected to said spindle, means for turning said spindle on its own axis and means for moving said vibratory weight so that its center of gravity is brought to the geometrical axis of said spindle, or away therefrom at will, substantially as described.

2. In a device of the class described, a tactor, a handle therefor, a rotary spindle carried by said handle, a disk carried pivotally by said spindle near one end thereof, a vibratory weight carried near the circumference of said disk and means for turning said disk on its pivot, substantially as described.

3. In a device of the class described, a hollow tactor, a handle fastened thereto, a rotary spindle within said handle, a disk within said tactor carried pivotally by said spindle, a vibratory weight carried near the circumference of said disk and means extending through said handle for turning said disk on its pivot, substantially as described.

4. In a device of the class described, a tactor, a handle therefor, a pivoted disk carried by said handle, a vibratory weight on said disk, means for rotating said disk around an axis in its own plane and adjusting means for turning said disk on its own pivot, substantially as described.

5. In a device of the class described, a tactor, a handle therefor, a pivoted disk carried by said handle, a vibratory weight on said disk, means for rotating said disk around an axis in its own plane and passing through its center and adjusting means for turning said disk on its own pivot, substantially as described.

6. In a device of the class described, a compound spindle comprising an inner member and an outer tubular member surrounding the same, a slotted disk pivoted to one of said members and bearing a weight near its circumference, a pin fixed to the other member and passing through said slot and means for producing relative longitudinal movement of said two members, substantially as described.

7. In a device of the class described, a compound spindle comprising an inner forked member and an outer tubular member surrounding the same, a slotted disk bearing a weight near its circumference and pivoted in the sides of said tube, a pin passing through said slot and the fork of said inner member and means for producing relative longitudinal movement of said two members, substantially as described.

8. In a device of the class described, a tactor, a handle therefor, a rotary tube longitudinally immovable within said handle, a forked rod within said tube, a slotted disk having a weight near its circumference and pivoted to said tube, a pin passing through the fork of said rod and through said slot and means for moving said rod inward and outward in said tube, substantially as described.

9. In a device of the class described, a compound spindle comprising an exterior tube and an interior rod forked in two directions, a slotted disk lying in one fork and having a pivot passing through the other fork in said rod, said pivot turning in bearings in said tube, a weight near the circumference of said disk and a pin passing through said rod and the slot in said disk, substantially as described.

10. In a device of the class described, a tactor, a handle therefor, a compound spindle within said handle comprising a tube and a rod within it having a narrow extension protruding from the end of said handle, a bearing-plate fitting over said extension, a sleeve also fitting over said extension and fixed thereto, a thimble loosely surrounding said sleeve, an adjusting-tube screwing in and out of said handle and flanges on said tube and said thimble secured together and to said thrust-plate, substantially as described.

HAROLD W. SHONNARD.

Witnesses:
FLORENCE S. PICK,
H. S. MACKAYE.